(12) United States Patent
Hochi et al.

(10) Patent No.: US 11,491,795 B2
(45) Date of Patent: Nov. 8, 2022

(54) OPTICAL SENSOR REMOVAL MECHANISM FOR A PRINTING APPARATUS

(71) Applicant: SEIKO EPSON CORPORATION, Tokyo (JP)

(72) Inventors: Hiroya Hochi, Matsumoto (JP); Kenichiro Kaneko, Okaya (JP)

(73) Assignee: Seiko Epson Corporation, Tokyo (JP)

(*) Notice: Subject to any disclaimer, the term of this patent is extended or adjusted under 35 U.S.C. 154(b) by 32 days.

(21) Appl. No.: 17/128,672

(22) Filed: Dec. 21, 2020

(65) Prior Publication Data

US 2021/0187954 A1 Jun. 24, 2021

(30) Foreign Application Priority Data

Dec. 24, 2019 (JP) .............................. JP2019-232731

(51) Int. Cl.
*B41J 2/175* (2006.01)
*G01D 5/347* (2006.01)
*B41J 19/20* (2006.01)

(52) U.S. Cl.
CPC ......... *B41J 2/17503* (2013.01); *B41J 19/202* (2013.01); *B41J 19/205* (2013.01); *B41J 19/207* (2013.01); *G01D 5/347* (2013.01)

(58) Field of Classification Search
CPC .... B41J 2/17503; B41J 19/202; B41J 19/205; B41J 19/207; B41J 29/02; B41J 25/001; B41J 25/3082; G01D 5/347; G01D 5/34753
See application file for complete search history.

(56) References Cited

U.S. PATENT DOCUMENTS

2006/0146106 A1* 7/2006 Naruse ................... B41J 19/207
347/86
2013/0279062 A1* 10/2013 Kataoka ................... H05F 1/00
361/215

FOREIGN PATENT DOCUMENTS

JP 2008-238685 A 10/2008

* cited by examiner

*Primary Examiner* — Henok D Legesse
(74) *Attorney, Agent, or Firm* — Workman Nydegger (57) ABSTRACT

The printing apparatus includes a carriage having a print head mounted thereon, a carriage guide configured to guide movement of the carriage and to support the carriage, an optical scale member having an optical scale, an optical sensor mounting member having an optical sensor mounted thereon to read the optical scale, the optical sensor mounting member being fixed to a support surface of a support wall of the carriage, and a head portion of the fixing screw configured to be switched between a fixed state in which the optical sensor mounting member is fixed to the carriage and a release state in which the fixed state is released. The head of the fixing screw is located on a side opposite to the support surface with respect to the support wall when the optical sensor mounting member is in the fixed state.

16 Claims, 7 Drawing Sheets

OPTICAL SENSOR REMOVAL MECHANISM FOR A PRINTING APPARATUS

The present application is based on, and claims priority from JP Application Serial Number 2019-232731, filed Dec. 24, 2019, the disclosure of which is hereby incorporated by reference herein in its entirety.

BACKGROUND

1. Technical Field

The present disclosure relates to a printing apparatus such as an ink jet printer or the like.

2. Related Art

As such a type of printing apparatus, a printing apparatus such as that described in, for example, JP-A-2008-238685 is known. The printing apparatus includes an encoder including an optical scale having an optical scale and an optical sensor configured to read the optical scale to perform movement control of a carriage on which a print head is provided.

Since such an optical sensor is directly mounted on the carriage, it may become contaminated or damaged. In such a case, the optical sensor needs to be removed from the carriage in order to clean or replace the optical sensor.

However, in the above-described printing apparatus, the optical sensor is provided on a back surface of the carriage, and thus, particularly, when the carriage is large, there is a problem that it becomes difficult to mount/remove the optical sensor on/from the carriage.

SUMMARY

A printing apparatus which solves the above-described problems includes a carriage having a print head mounted thereon, the carriage being configured to move in a scanning direction, a carriage guide disposed extending in the scanning direction and configured to guide movement of the carriage and to support the carriage, an optical scale member having an optical scale and disposed extending in the scanning direction, an optical sensor mounting member having an optical sensor mounted thereon to read the optical scale of the optical scale member, the optical sensor mounting member being fixed to a support surface of a support wall of the carriage, the support wall being a wall supported by the carriage guide, and an operated part configured to be switched between a fixed state in which the optical sensor mounting member is fixed to the carriage and a released state in which the fixed state is released, wherein the operated part is located on a side opposite to the support surface with respect to the support wall of the carriage when the optical sensor mounting member is in the fixed state.

DESCRIPTION OF EXEMPLARY EMBODIMENTS

Figure 1:
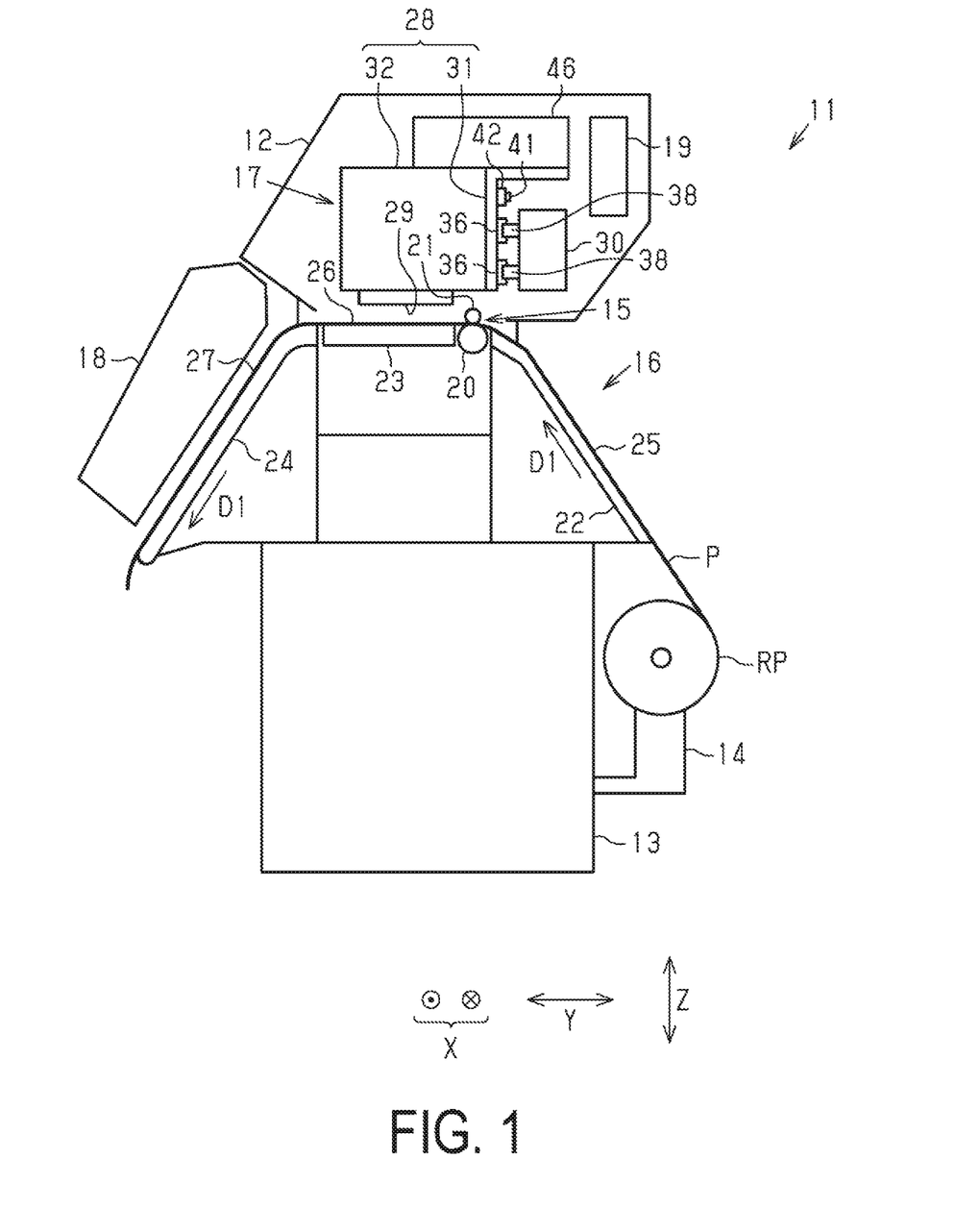
FIG. 1 is a side view schematically showing an embodiment of a printing apparatus.

One embodiment of a printing apparatus will be described below with reference to the accompanying drawings. In FIG. 1, it is assumed that a printing apparatus 11 is placed on a horizontal surface, and a vertical direction in FIG. 1 is a vertical direction Z. In addition, in two directions orthogonal to the vertical direction Z when the printing apparatus 11 is seen from the front which is the left side surface in FIG. 1, a direction orthogonal to the plane of the drawing in FIG. 1 is referred to as a width direction X, and a left-right direction in FIG. 1 is referred to as a depth direction Y. In the depth direction Y, the left side in FIG. 1 is the front side or the front surface side, and the right side in FIG. 1 is the rear side or the back surface side.

As shown in FIG. 1, the printing apparatus 11 is configured of, for example, an inkjet printer, and includes a housing 12, a base 13, a holding part 14, a conveyance part 15, a support part 16, a printing part 17, a drying part 18, and a control part 19.

The base 13 supports the housing 12 from below the housing 12. The holding part 14 is mounted on the base 13 and rotatably holds a roll body RP around which a medium P on which printing has not yet been performed is wound. The conveyance part 15 is configured to convey the medium P, and includes a first roller 20 and a second roller 21. The first roller 20 and the second roller 21 are disposed within the housing 12.

The first roller 20 is in contact with the medium P from below. The second roller 21 is in contact with the medium P from above. Further, when the first roller 20 and the second roller 21 rotate in a state in which the medium P is sandwiched therebetween, the medium P is conveyed. In this way, the conveyance part 15 conveys the medium P. In the embodiment, the conveyance part 15 conveys the medium P, and thus the medium P is fed from the roll body RP held by the holding part 14.

The support part 16 is configured to form a conveyance path for the medium P and to support the medium P. The support part 16 includes a first support 22, a second support 23, and a third support 24. The first support 22, the second support 23, and the third support 24 are configured of, for example, a plate-like member. The first support 22, the second support 23, and the third support 24 are disposed to support the medium P from below and to be arranged in that order in a conveyance direction D1 which is a direction in which the medium P is conveyed.

The first support 22 includes a first support surface 25 which is in contact with the medium P. The first support 22 is located upstream from the conveyance part 15 in the conveyance direction D1. The second support 23 includes a second support surface 26 which is in contact with the medium P. The second support 23 is located downstream from the conveyance part 15 in the conveyance direction D1.

The third support 24 includes a third support surface 27 which is in contact with the medium P. The third support 24 is located downstream from the conveyance part 15 in the conveyance direction D1. The third support 24 is located downstream from the second support 23 in the conveyance direction D1. Thus, the conveyance part 15 is located between the first support 22 and the second support 23 in the conveyance direction D1.

In the embodiment, since the medium P is conveyed along the first support surface 25, the second support surface 26, and the third support surface 27, the conveyance direction D1 is a direction which extends along the first support surface 25, the second support surface 26, and the third support surface 27. The printing part 17 performs a printing operation on the medium P by discharging a liquid such as ink, for example. The printing part 17 includes a carriage 28 and a print head 29 mounted on the carriage 28.

The print head 29 faces the second support surface 26 and is configured to allow a liquid to be discharged. In other words, the print head 29 is configured to allow a liquid to be discharged to a portion of the medium P which is supported by the second support 23. The carriage 28 is configured to perform a scanning operation with respect to the medium P. A carriage guide 30 which supports the carriage 28 is supported on the back surface side of the carriage 28 in the housing 12. The carriage guide 30 is disposed extending in the width direction X which is a scanning direction of the carriage 28 with respect to the medium P and guides movement of the carriage 28.

Further, an image is printed on the medium P by discharging the liquid from the print head 29 while the carriage 28 reciprocates in the width direction X in a state in which it is guided by the carriage guide 30. That is, the print head 29 according to the embodiment is a serial head. The drying part 18 is disposed to face the third support surface 27 and dries the medium P by blowing hot air on a portion of the medium P supported by the third support surface 27 after printing.

The control part 19 can be constituted as a: one or more processors configured to perform various processes in accordance with a computer program, β: one or more dedicated hardware circuits, such as application specific integrated circuits, which perform at least some of the various processes, or y: a circuit which includes a combination thereof.

The processor includes a CPU and a memory such as a RAM and a ROM, and the memory stores a program code or a command configured to cause the CPU to perform a process. The memory or a computer readable medium includes any readable medium which can be accessed by a general-purpose or dedicated computer. The control part 19 in the embodiment comprehensively controls the printing apparatus 11.

Figure 2:
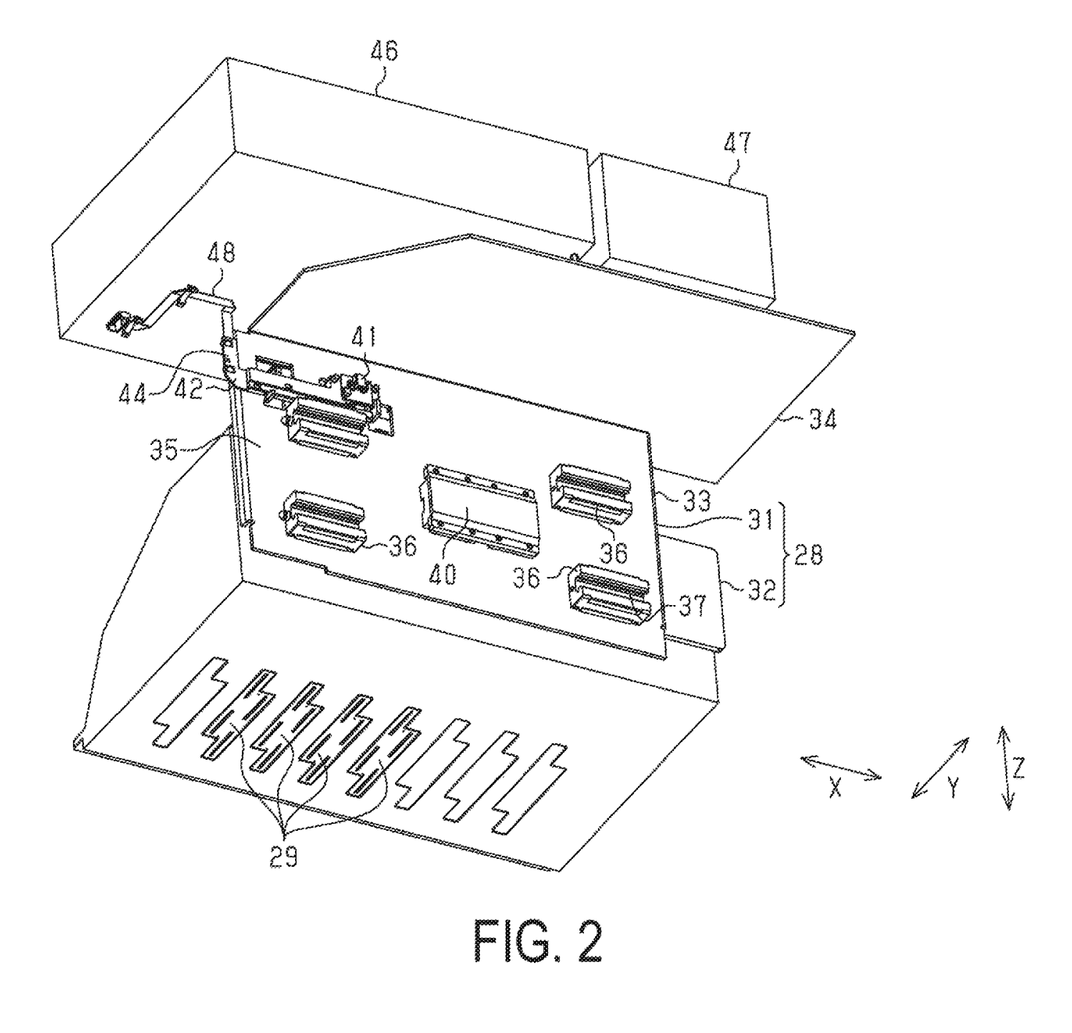
FIG. 2 is a perspective view of the carriage from the back side.
Figure 3:
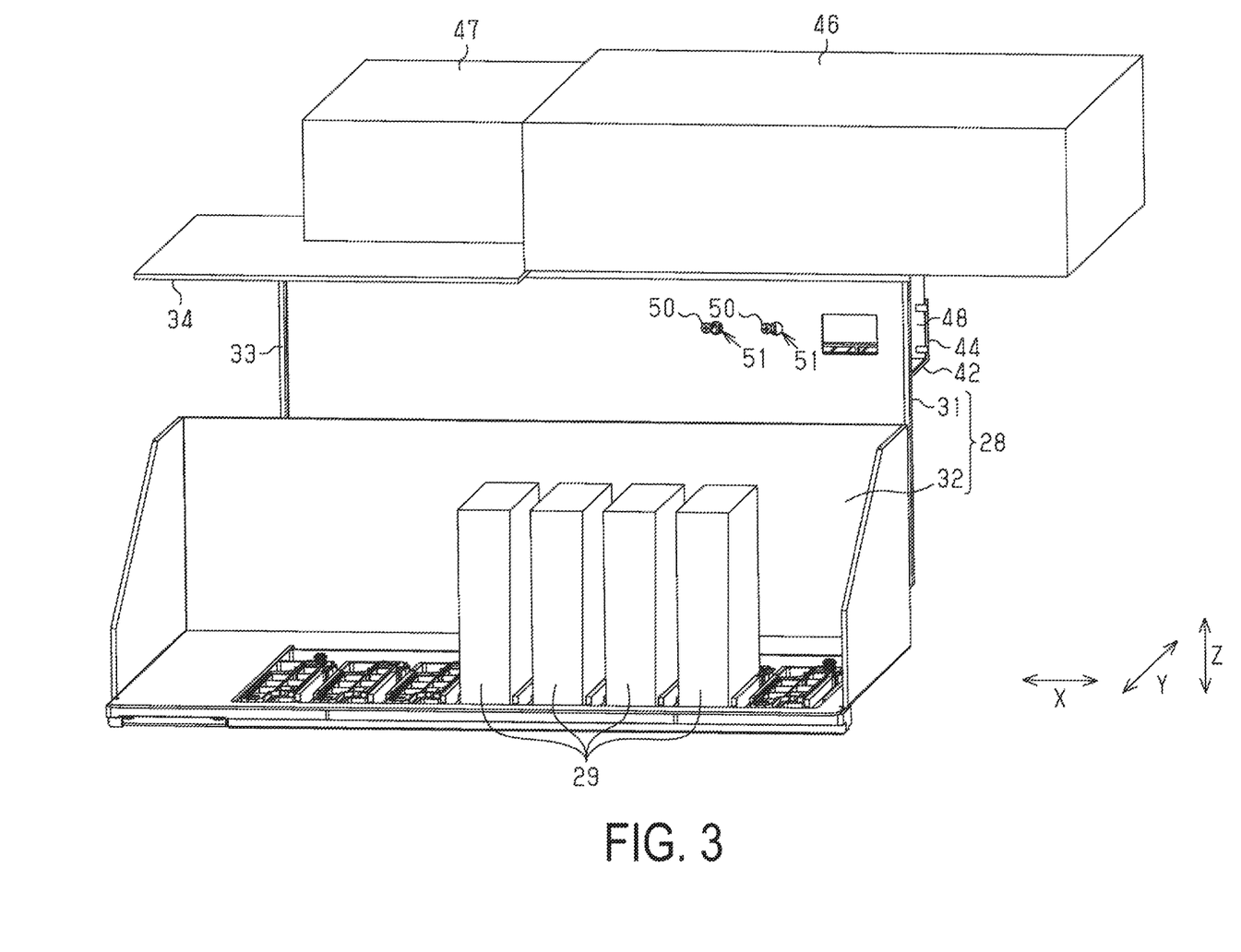
FIG. 3 is a perspective view of the carriage from the front side.

As shown in FIGS. 1 to 3, the carriage 28 includes an L-shaped plate-like first carriage part 31 supported by the carriage guide 30, and a substantially bottomed box-shaped second carriage part 32 fixed to the front side of the first carriage part 31. A plurality of (four in the embodiment) print heads 29 are disposed in the second carriage part 32 to be arranged in the width direction X. A bottom surface of each of the print heads 29 is exposed from a bottom surface of the second carriage part 32 to the outside.

Figure 4:
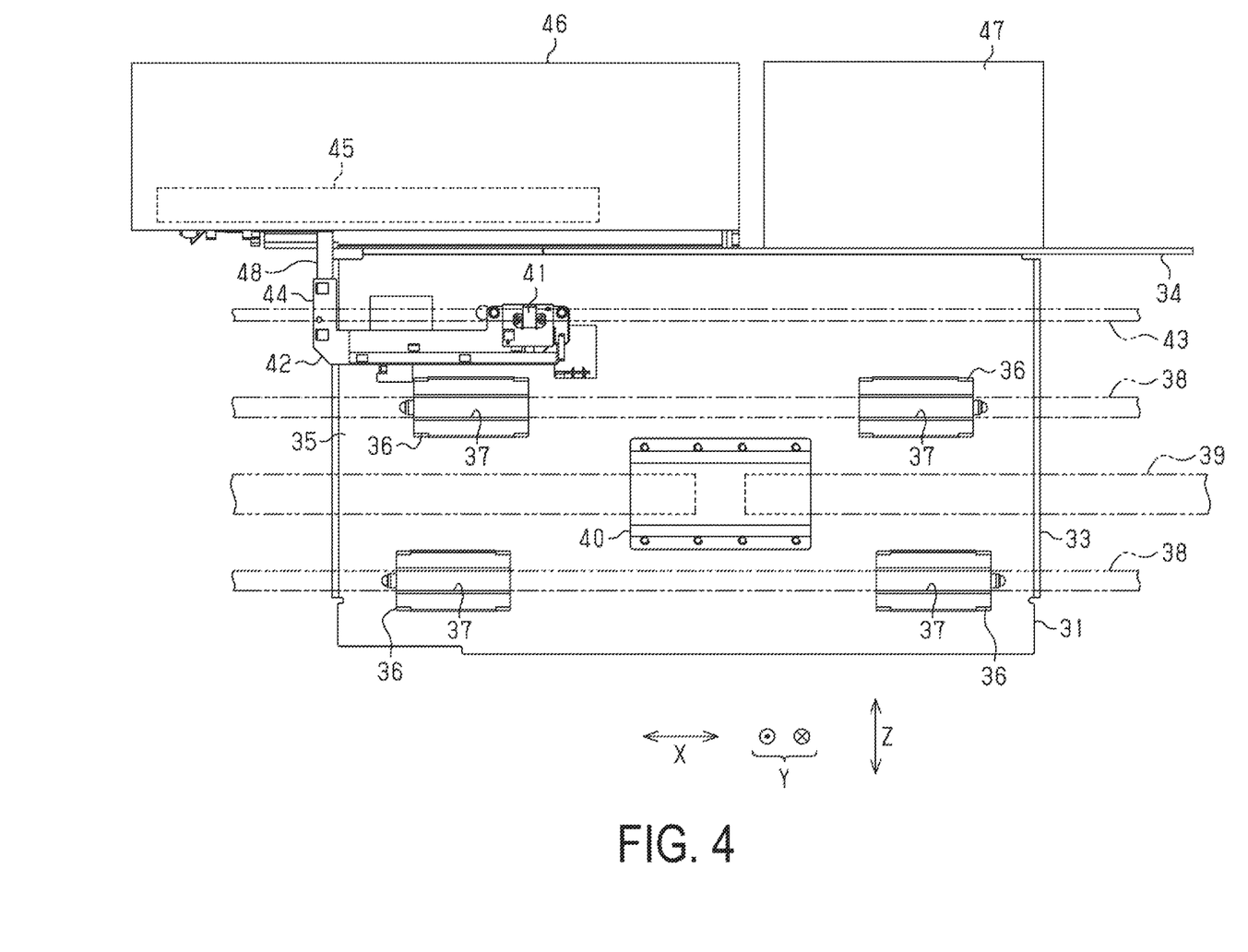
FIG. 4 is a rear view of a first carriage part.

As shown in FIGS. 1, 2, and 4, the first carriage part 31 includes a substantially rectangular plate-shaped support wall 33 orthogonal to the depth direction Y, and a substantially rectangular plate-shaped top wall 34 which extends straight from an upper end of the support wall 33 to the back surface side. The support wall 33 and the top wall 34 are integrally formed to form a right angle. A pair of blocks 36 disposed at intervals in the width direction X are fixed in two sets at intervals in the vertical direction Z on a support surface 35 which is a back surface of the support wall 33. That is, four blocks 36 are fixed to the support surface 35 of the embodiment.

A groove 37 which extends in the width direction X is formed in each of the blocks 36. The carriage guide 30 includes a pair of rails 38 extending in the width direction X on a surface thereof facing the support surface 35. The pair of rails 38 are disposed at intervals in the vertical direction Z. The grooves 37 of a pair of blocks 36 on the upper side which are fixed to the support surface 35 are slidably fitted to each of the rails 38 on the upper side of the carriage guide 30.

The grooves 37 of the pair of blocks 36 on the lower side which are fixed to the support surface 35 are slidably fitted to each of the rails 38 on the lower side of the carriage guide 30. Each of the blocks 36 and each of the rails 38 are configured of a linear guide, for example. Thus, the support wall 33 is a wall supported by the carriage guide 30 in the carriage 28.

A fixing plate 40 which fixes both end portions of a timing belt 39 to the support surface 35 is fixed to a substantially central portion of the support surface 35 in a state in which the long band-like timing belt 39 is in an annular shape. The fixing plate 40 is disposed at a position which has a height between the pair of blocks 36 on the upper side of the support surface 35 and the pair of blocks 36 on the lower side thereof. That is, the fixing plate 40 is fixed to the support surface 35 to be located between the pair of blocks 36 on the upper side and the pair of blocks 36 on the lower side in the vertical direction Z.

One end portion of the annular timing belt 39 in the width direction X is wound around a drive pulley (not shown) having a rotating shaft extending in the vertical direction Z, and the other end portion thereof is wound around a driven pulley (not shown) having a rotating shaft extending in the vertical direction Z. Then, the drive pulley (not shown) is driven to rotate in both forward and reverse directions by a motor (not shown), and thus a driving force of the motor (not shown) is transmitted to the carriage 28 via the timing belt 39 and the carriage 28 reciprocates in the width direction X.

An optical sensor mounting member 42 on which an optical sensor 41 is mounted is removably fixed to one end portion of an upper end portion of the support surface 35 in the width direction X. In this case, the optical sensor mounting member 42 is located above the pair of blocks 36 on the upper side of the support surface 35. A band-like optical scale member 43 having an optical scale is disposed at a position above the carriage guide 30, which is a position on the back surface side of the carriage 28 in the housing 12, to extend in the width direction X.

The optical scale member 43 is disposed to correspond to the optical sensor 41 mounted on the optical sensor mounting member 42. The optical sensor 41 is engaged with the optical scale member 43 and is configured to be able to read the optical scale of the optical scale member 43. The optical sensor 41 and the optical scale member 43 are configured of, for example, a linear encoder. Thus, a position in the width direction X of the carriage 28 is found by the optical sensor 41 counting the optical scale of the optical scale member 43 according to the movement of the carriage 28 in the width direction X.

The optical sensor mounting member 42 is formed in substantially a band shape which extends in the width direction X. In the optical sensor mounting member 42, the optical sensor 41 is removably mounted on one end portion thereof in the width direction X, and a bent portion 44 to be bent upward is formed at the other end portion. When the optical sensor mounting member 42 is in a fixed state with respect to the support surface 35, the bent portion 44 which is a part of the optical sensor mounting member 42 protrudes outward in the width direction X further than an end portion of the support surface 35 of the carriage 28 on the bent portion 44 side in the width direction X.

In FIG. 4, the bent portion 44 of the optical sensor mounting member 42 protrudes to the left side further than a left end portion of the support surface 35. That is, when the optical sensor mounting member 42 is in the fixed state with respect to the support surface 35, the bent portion 44 is visible from the front side of the carriage 28.

A board box 46 which accommodates a sensor board 45 for controlling the optical sensor 41, and a tube holding portion 47 which holds a tube (not shown) for supplying a liquid to each of the print heads 29 are fixed on the top wall 34 of the carriage 28 in a state in which they are arranged in the width direction X. In this case, the board box 46 is disposed closer to the optical sensor 41 than the tube holding portion 47 in the width direction X.

The sensor board 45 is disposed above the carriage guide 30 in the carriage 28. That is, the sensor board 45 is disposed above the optical sensor 41 in the carriage 28. The optical sensor 41 is located above the carriage guide 30 when the optical sensor mounting member 42 is in the fixed state with respect to the support surface 35. The sensor board 45 and the optical sensor 41 are electrically coupled by a cable 48. The cable 48 is configured of, for example, a flexible flat cable (FFC).

Figure 5:
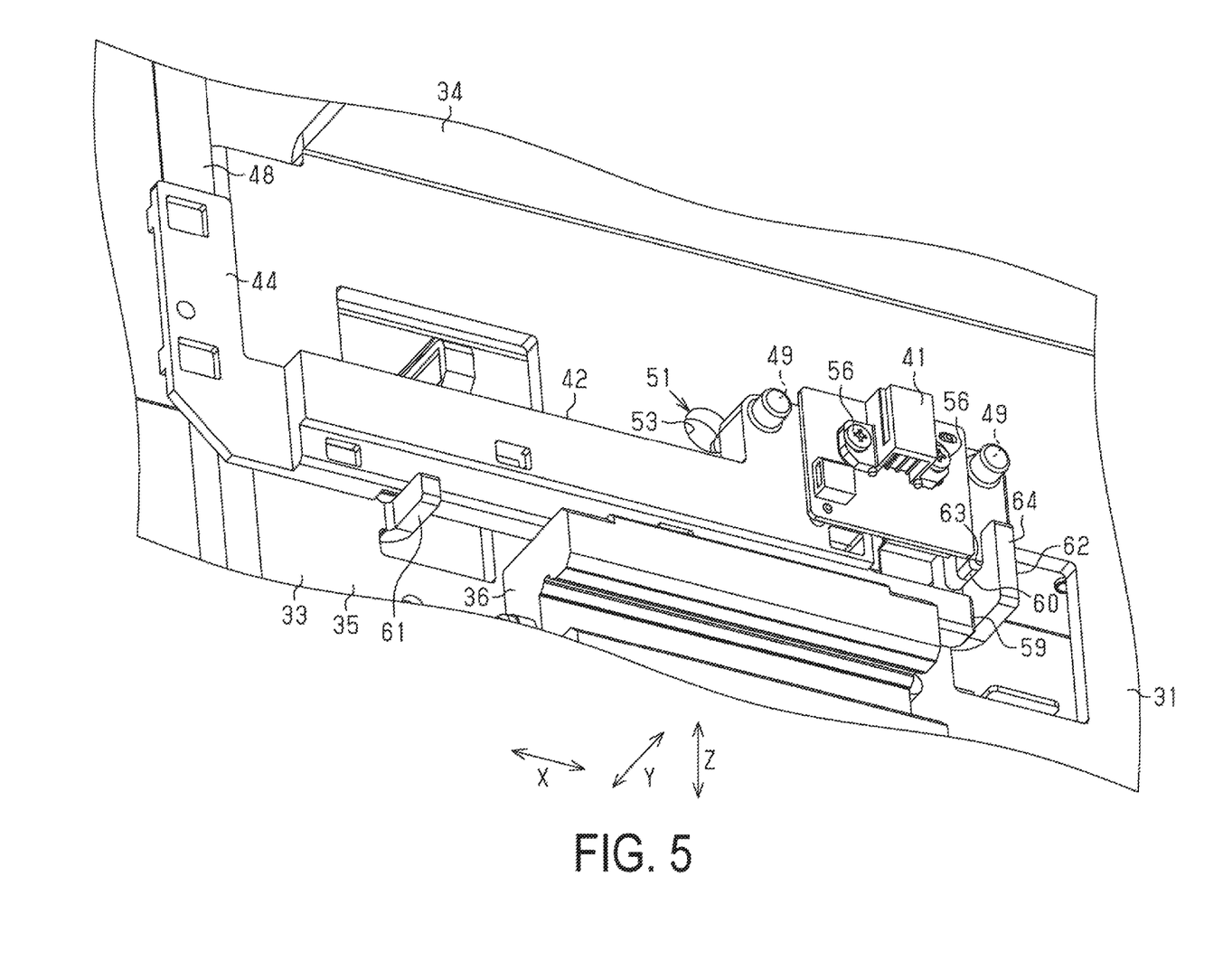
FIG. 5 is an enlarged perspective view of a main part of FIG. 4.
Figure 6:
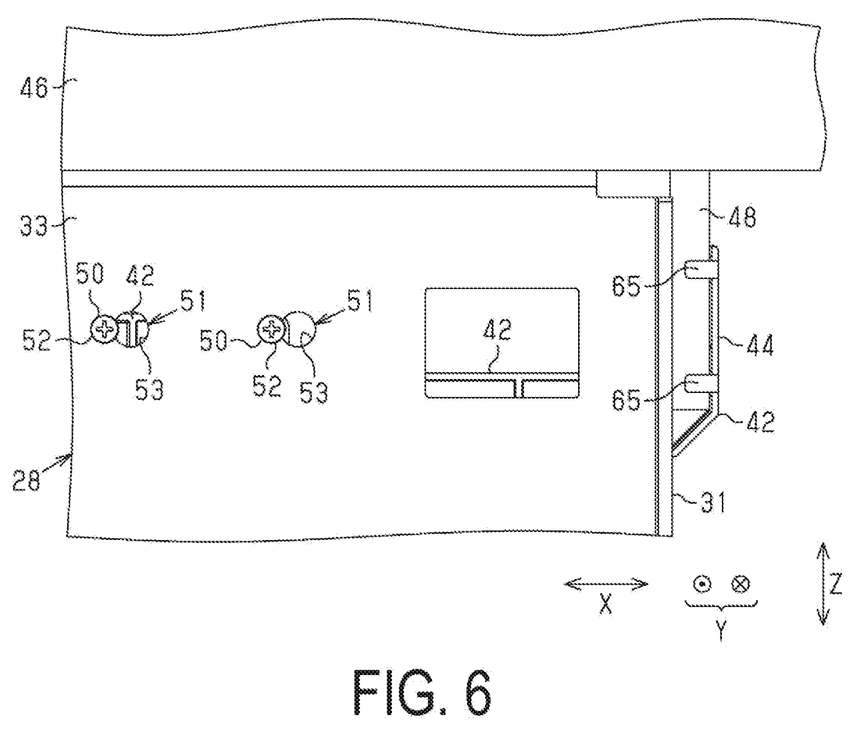
FIG. 6 is an enlarged view of a main part of FIG. 3.
Figure 8:
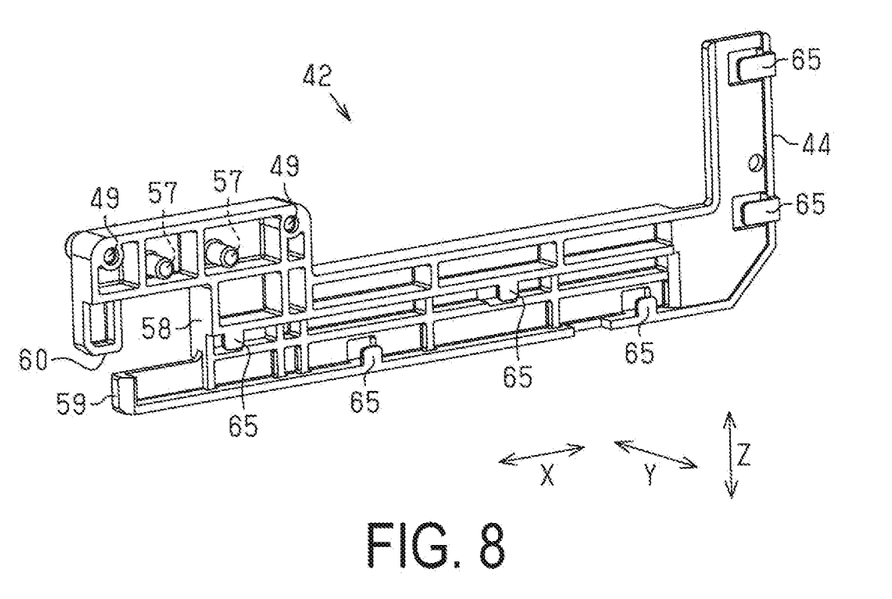
FIG. 8 is a perspective view of the optical sensor mounting member from the other side.

As shown in FIGS. 5, 6, and 8, a pair of screw holes 49 are formed at intervals in the width direction X in an upper end portion of an end portion of a surface of the optical sensor mounting member 42, which faces the support surface 35, on the optical sensor 41 side. A pair of substantially gourd-shaped insertion holes 51 through which a pair of fixing screws 50 for fixing the optical sensor mounting member 42 to the support surface 35 of the support wall 33 of the carriage 28 are inserted are formed at positions on the support wall 33 corresponding to the pair of screw holes 49 in the depth direction Y to pass therethrough.

Figure 9:
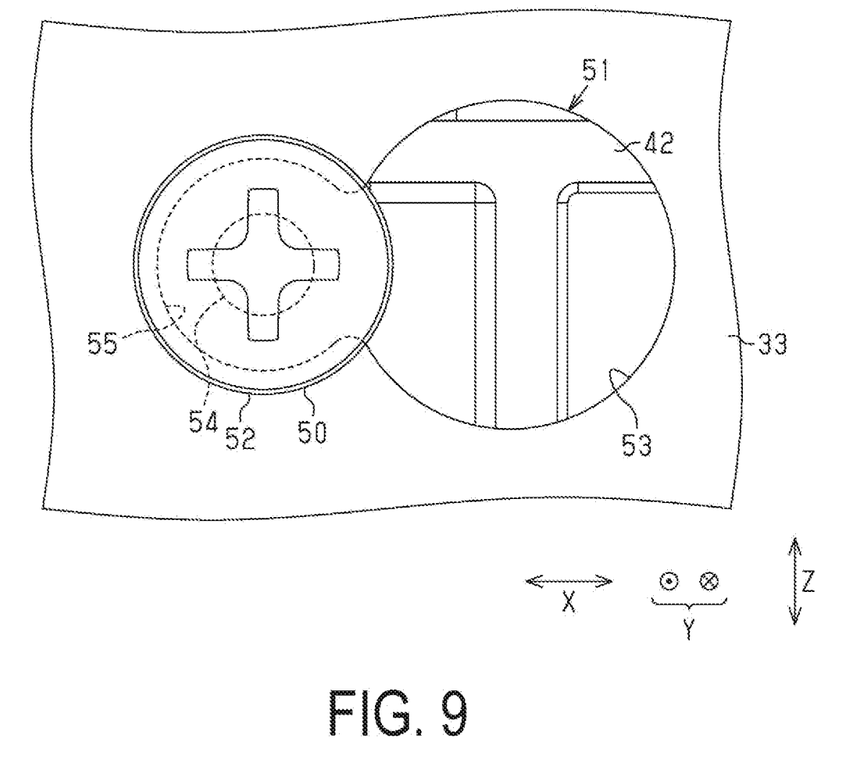
FIG. 9 is an enlarged view of a main part of FIG. 6.

As shown in FIGS. 5, 6, and 9, each of the insertion holes 51 includes a first hole portion 53 through which a head portion 52 of the fixing screw 50 can be inserted, and a second hole portion 55 through which the head portion 52 of the fixing screw 50 cannot be inserted and a shaft portion 54 of the fixing screw 50 can be inserted. The first hole portion 53 and the second hole portion 55 are in communication with each other in a state in which they are arranged in the width direction X. A width of a communicating portion between the first hole portion 53 and the second hole portion 55 is wider than an outer diameter of the shaft portion 54 of the fixing screw 50. In each of the insertion holes 51, the first hole portion 53 is located closer to the bent portion 44 of the optical sensor mounting member 42 than the second hole portion 55.

When the optical sensor mounting member 42 is fixed to the support surface 35 of the support wall 33 by the pair of fixing screws 50, the shaft portions 54 of the pair of fixing screws 50 are each screwed from the front surface side of the support wall 33 into the pair of screw holes 49 through the pair of second hole portions 55 in a state in which the pair of screw holes 49 of the optical sensor mounting member 42 each face the second hole portions 55 of the pair of insertion holes 51.

That is, the optical sensor mounting member 42 is in the fixed state in which it is fixed to the support surface 35 by inserting a Phillips screwdriver into the head portion 52 of the fixing screw 50 and rotating the fixing screw 50 in the forward direction to screw in the fixing screw 50. On the other hand, the optical sensor mounting member 42 is in a released state in which the fixed state with respect to the support surface 35 is released by inserting a Phillips screwdriver into the head portion 52 of the fixing screw 50 and rotating the fixing screw 50 in the reverse direction opposite to the forward direction to loosen the fixing screw 50.

Accordingly, in the embodiment, an operated part which can be switched between the fixed state in which the optical sensor mounting member 42 is fixed to the support surface 35 of the carriage 28 and the released state in which the fixed state is released is configured of the head portion 52 of the fixing screw 50. When the optical sensor mounting member 42 is in the fixed state in which it is fixed to the support surface 35, the head portion 52 of the fixing screw 50 which is the operated part is located on the front surface side of the support wall 33 opposite to the support surface 35 with respect to the support wall 33 of the carriage 28.

Figure 7:
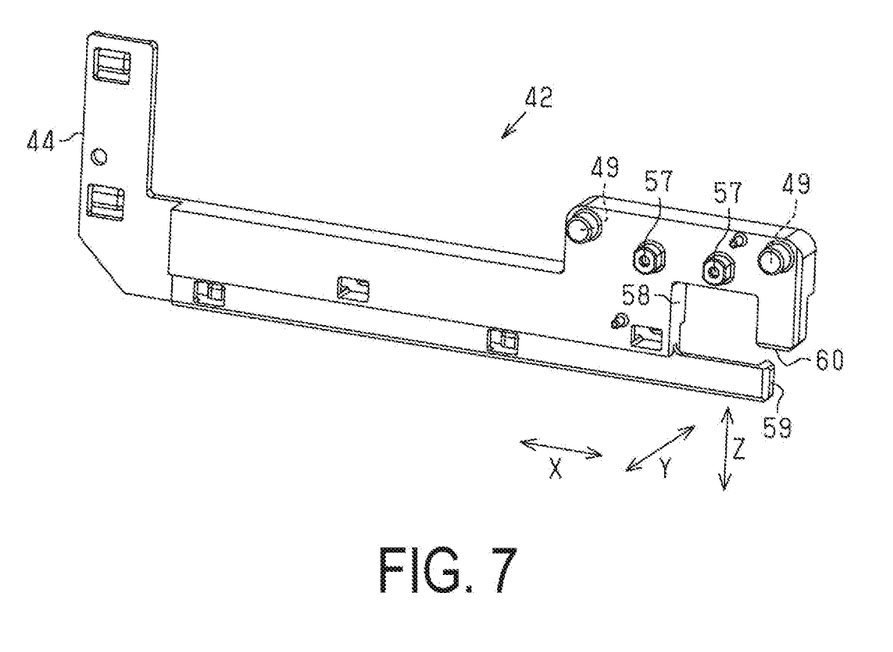
FIG. 7 is a perspective view of an optical sensor mounting member from one side.

As shown in FIGS. 5 and 7, a pair of mounting screw holes 57 for mounting the optical sensor 41 by a pair of mounting screws 56 are formed in an upper end portion of an end portion on the side opposite to the bent portion 44 side in a surface of the optical sensor mounting member 42 on the side opposite to the support surface 35 side to be arranged at intervals in the width direction X. The pair of mounting screw holes 57 are located inside the pair of screw holes 49 in the width direction X.

In the optical sensor mounting member 42, an opening portion 58 through which the cable 48 is inserted is formed below the pair of mounting screw holes 57. In the optical sensor mounting member 42, a first contact surface 59 orthogonal to the width direction X is formed on the outer side from the opening portion 58 in the width direction X. In the optical sensor mounting member 42, a second contact surface 60 orthogonal to the vertical direction Z is formed above the first contact surface 59 to be directed downward.

A first support protrusion portion 61 which supports an end portion of the optical sensor mounting member 42 on the bent portion 44 side in the released state from below, and a second support protrusion portion 62 which supports an end portion of the optical sensor mounting member 42 on the side opposite to the bent portion 44 side in the released state from below are provided on the support surface 35. The first support protrusion portion 61 has a quadrangular pillar shape. The second support protrusion portion 62 has a plate shape orthogonal to the width direction X. That is, a thickness direction of the second support protrusion portion 62 coincides with the width direction X.

A cutout recessed portion 63 which forms a U-shape when seen in the width direction X is formed on an upper surface of the second support protrusion portion 62. A restriction wall 64 which forms a part of the cutout recessed portion 63 is provided on the rear side of the cutout recessed portion 63 in the second support protrusion portion 62. Additionally, the optical sensor mounting member 42 in the released state is positioned by bringing a lower surface into contact with an upper surface of the first support protrusion portion 61, bringing the first contact surface 59 into contact with a side surface of the second support protrusion portion 62, and bringing the second contact surface 60 into contact with a bottom surface of the cutout recessed portion 63 of the second support protrusion portion 62.

At this time, the optical sensor mounting member 42 is restricted from moving rearward by the restriction wall 64 of the second support protrusion portion 62. Accordingly, in the embodiment, a positioning part which positions the optical sensor mounting member 42 in the released state is constituted by the first support protrusion portion 61 and the second support protrusion portion 62.

In other words, the optical sensor mounting member 42 in the released state is positioned in the vertical direction Z by the upper surface of the first support protrusion portion 61 and the bottom surface of the cutout recessed portion 63 of the second support protrusion portion 62, the positioning in the width direction X is done by the side surface of the second support protrusion portion 62, and the positioning in the depth direction Y is done by the restriction wall 64 of the second support protrusion portion 62.

As shown in FIGS. 5, 8, and 9, in a state in which the optical sensor mounting member 42 in the released state is positioned, the pair of screw holes 49 of the optical sensor mounting member 42 each face the second hole portions 55 of the pair of insertion holes 51 of the supporting wall 33 in the depth direction Y.

As shown in FIGS. 2 and 5, when the optical sensor mounting member 42 is positioned, and the positioned optical sensor mounting member 42 is removed from the carriage 28, the optical sensor mounting member 42 is moved along the support surface 35 in the width direction X. Accordingly, in the embodiment, a attaching and removing direction of the optical sensor mounting member 42 to and from the support surface 35 of the carriage 28 coincides with the width direction X which is the scanning direction of the carriage 28.

As shown in FIGS. 4 and 8, a plurality of hooking claws 65 are provided at the optical sensor mounting member 42 as an example of a cable support part configured to support a cable 48 which electrically couples the sensor board 45 with the optical sensor 41. The plurality of hooking claws 65 are configured to be able to hook the cable 48 and are provided on a surface of the optical sensor mounting member 42 facing the support surface 35 to be arranged at appropriate intervals in a direction in which the optical sensor mounting member 42 extends.

Next, an operation when the optical sensor 41 of the printing apparatus 11 configured as described above is replaced will be described.

When the optical sensor 41 is replaced, first, the carriage 28 is stopped at a position at which a space is provided on the optical sensor mounting member 42 side of the carriage 28. In other words, when the bent portion 44 of the optical sensor mounting member 42 is exposed from the right side of the carriage 28 when seen from the front as described above, the carriage 28 is stopped at a position on the left side from the printed region of the medium P. Subsequently, as shown in FIG. 4, the cable 48 is removed from the sensor board 45.

Next, as shown in FIGS. 3 and 6, a Phillips screwdriver is inserted into the head portions 52 of the pair of fixing screws 50 from the front surface side of the support wall 33 of the carriage 28, and the fixing screws 50 are rotated in the reverse direction opposite the forward direction to sequentially loosen the pair of fixing screws 50. As a result, the optical sensor mounting member 42 is in the released state in which the fixed state with respect to the support surface 35 is released. At this time, the shaft portions 54 of the pair of fixing screws 50 are partially screwed into the pair of screw holes 49 of the optical sensor mounting member 42.

Next, as shown in FIGS. 6 and 9, the bent portion 44 of the optical sensor mounting member 42 exposed from the carriage 28 is gripped, and the optical sensor mounting member 42 is moved in the width direction X so that the shaft portions 54 of the pair of fixing screws 50 move from the inside of the second hole portions 55 of the pair of insertion holes 51 into the first hole portions 53. As a result, the restriction of the rearward movement of the optical sensor mounting member 42 due to the restriction wall 64 of the second support protrusion portion 62 is released.

Subsequently, the optical sensor mounting member 42 is moved rearward so that the head portions 52 of the pair of fixing screws 50 each pass through the first hole portions 53 of the pair of insertion holes 51. Subsequently, the optical sensor mounting member 42 is moved in the width direction X so that the bent portion 44 of the optical sensor mounting member 42 is away from the carriage 28 in the width direction X. Thereafter, the optical sensor 41 is removed to the front of the carriage 28 together with the optical sensor mounting member 42.

Subsequently, the cable 48 is removed from the old optical sensor 41. Subsequently, the pair of mounting screws 56 are loosened and removed from the pair of mounting screw holes 57, and thus the old optical sensor 41 is removed from the optical sensor mounting member 42. Subsequently, after the cable 48 is coupled to a new optical sensor 41, the new optical sensor 41 is mounted on the optical sensor mounting member 42 by the pair of mounting screws 56.

Subsequently, the bent portion 44 of the optical sensor mounting member 42 on which the new optical sensor 41 is mounted is gripped, and the optical sensor mounting member 42 is moved rearward from the side of the carriage 28 in the depth direction Y. Next, as shown in FIG. 5, the optical sensor mounting member 42 is moved toward the second support protrusion portion 62 along the support surface 35 in the width direction X. Next, the optical sensor mounting member 42 is moved so that the head portions 52 of the pair of fixing screws 50 face the first hole portions 53 of the pair of insertion holes 51 in the depth direction Y.

Subsequently, the optical sensor mounting member 42 is moved forward so that the head portions 52 of the pair of fixing screws 50 each pass through the first hole portions 53 of the pair of insertion holes 51. Next, the optical sensor mounting member 42 is moved in the width direction X so that the shaft portions 54 of the pair of fixing screws 50 each move from the inside of the first hole portions 53 of the pair of insertion holes 51 into the second hole portions 55.

As a result, the optical sensor mounting member 42 is positioned by bringing the lower surface into contact with an upper surface of the first support protrusion portion 61, bringing the first contact surface 59 into contact with the side surface of the second support protrusion portion 62, and bringing the second contact surface 60 into contact with the bottom surface of the cutout recessed portion 63 of the second support protrusion portion 62. At this time, the optical sensor mounting member 42 is restricted from moving rearward by the restriction wall 64 of the second support protrusion portion 62.

Next, a Phillips screwdriver is inserted into the head portions 52 of the pair of fixing screws 50 from the front surface side of the support wall 33 of the carriage 28, and the fixing screws 50 are rotated in the forward direction to sequentially screw the pair of fixing screws 50. Thus, the optical sensor mounting member 42 is in the fixed state in which it is fixed to the support surface 35. Subsequently, the cable 48 extending from the optical sensor 41 is coupled to the sensor board 45. Thus, the operation for replacing the optical sensor 41 is completed.

In this way, in the printing apparatus 11 according to the embodiment, the optical sensor mounting member 42 on which the optical sensor 41 is removably mounted can be switched between the fixed state in which the optical sensor mounting member 42 is fixed to the support surface 35 which is a rear surface of the support wall 33 of the carriage 28 and the released state in which the fixed state is released.

Additionally, a switching operation between the fixed state and the released state of the optical sensor mounting member 42 with respect to the support surface 35 can be performed by rotating the head portions 52 of the pair of fixing screws 50 located on the front surface side of the support wall 33 of the carriage 28 in the forward direction and the reverse direction. Accordingly, since the optical sensor mounting member 42 which is removably fixed to the support surface 35 located on the rear side of the carriage 28 can be easily mounted on and removed from the front side of the carriage 28, the optical sensor 41 can be easily replaced.

According to the above-described embodiment, the following effects can be obtained.

(1) The printing apparatus 11 includes the optical sensor mounting member 42 on which the optical sensor 41 is mounted and which is fixed to the support surface 35 of the support wall 33 supported by the carriage guide 30 of the carriage 28, and the head portion 52 of the fixing screw 50 which is switchable between the fixed state in which the optical sensor mounting member 42 is fixed to the carriage 28 and the released state in which the fixed state is released. Additionally, the head portion 52 of the fixing screw 50 is located on the side opposite to the support surface 35 with respect to the support wall 33 of the carriage 28 when the optical sensor mounting member 42 is in the fixed state.

According to such a configuration, because the fixing screw 50 can be screwed into or loosened from the side opposite to the support surface 35 with respect to the support wall 33, the optical sensor mounting member 42 can be easily switched between the fixed state and the released state without removing the carriage 28 from the carriage guide 30. Accordingly, since the optical sensor mounting member 42 can be easily mounted on and removed from the carriage 28, the optical sensor 41 can be easily replaced.

(2) In the printing apparatus 11, the screw hole 49 into which the shaft portion 54 of the fixing screw 50 is screwed is provided in the optical sensor mounting member 42. According to such a configuration, the optical sensor mounting member 42 can be easily fixed to the carriage 28 by simply screwing the shaft portion 54 of the fixing screw 50 into the screw hole 49.

(3) In the printing apparatus 11, the insertion hole 51 through which the fixing screw 50 is inserted is provided in the support wall 33, and the insertion hole 51 includes the first hole portion 53 through which the head portion 52 of the fixing screw 50 can be inserted, and the second hole portion 55 through which the head portion 52 of the fixing screw 50 cannot be inserted and the shaft portion 54 of the fixing screw 50 can be inserted.

According to such a configuration, the attaching and removing operation of the optical sensor mounting member 42 to and from the carriage 28 can be performed without completely removing the fixing screw 50 from the screw hole 49 of the optical sensor mounting member 42. Thus, dropping of the fixing screw 50 during the attaching and removing operation of the optical sensor mounting member 42 to and from the carriage 28 can be curbed.

(4) In the printing apparatus 11, when the optical sensor mounting member 42 is in the fixed state, a portion of the optical sensor mounting member 42 protrudes outward in the width direction X further than the support surface 35 of the carriage 28 in the width direction X. According to such a configuration, when the optical sensor mounting member 42 is in the fixed state, a portion of the optical sensor mounting member 42 is visible from the side of the carriage 28 opposite to the support surface 35 side. Accordingly, when the optical sensor mounting member 42 is removed from the carriage 28, the optical sensor mounting member 42 can also be easily accessed from the side of the carriage 28 opposite to the support surface 35 side.

(5) In the printing apparatus 11, the sensor board 45 for controlling the optical sensor 41 is mounted on the carriage 28 above the carriage guide 30, the optical sensor 41 is located above the carriage guide 30 when the optical sensor mounting member 42 is in the fixed state, and the sensor board 45 and the optical sensor 41 are coupled by the cable 48.

According to such a configuration, when the optical sensor mounting member 42 is in the fixed state, both the optical sensor 41 and the sensor board 45 are located above the carriage guide 30, and thus wiring of the cable 48 can be easily performed.

(6) In the printing apparatus 11, the plurality of hooking claws 65 configured to support the cable 48 are provided on the optical sensor mounting member 42. According to such a configuration, since the cable 48 is supported by the plurality of hooking claws 65, it is possible to suppress the cable 48 from shaking or coming into contact with other components during the movement of the carriage 28.

(7) In the printing apparatus 11, the attaching and removing direction of the optical sensor mounting member 42 to and from the carriage 28 coincides with the movement direction of the carriage 28. According to such a configuration, the carriage 28 can be moved to a position at which the mounting and removing operation of the optical sensor mounting member 42 to and from the carriage 28 can be easily performed.

(8) In the printing apparatus 11, the first support protrusion portion 61 and the second support protrusion portion 62 which position the optical sensor mounting member 42 in the released state are provided on the support surface 35 of the carriage 28. According to such a configuration, when the optical sensor mounting member 42 is mounted on the support surface 35 of the carriage 28, the optical sensor mounting member 42 can be positioned by the first support protrusion portion 61 and the second support protrusion portion 62.

MODIFIED EXAMPLES

The above-described embodiment may be implemented with the following modifications. Also, the embodiment and modified examples thereof to be described below may be implemented in combination within a range in which a technical contradiction does not arise.

- The first support protrusion portion 61 and the second support protrusion portion 62 do not necessarily have to be configured to position the optical sensor mounting member 42.
- The attaching and removing direction of the optical sensor mounting member 42 to and from the carriage 28 does not necessarily have to coincide with the movement direction of the carriage 28.
- The number of the plurality of hooking claws 65 configured to support the cable 48 in the optical sensor mounting member 42 may be arbitrarily changed or they may be omitted.
- The optical sensor 41 and the sensor board 45 do not necessarily have to be disposed above the carriage guide 30.

A portion of the optical sensor mounting member 42 does not necessarily have to protrude outward in the width direction X further than the support surface 35 of the carriage 28 in the width direction X when the optical sensor mounting member 42 is in the fixed state.

The insertion hole 51 does not necessarily have to include the first hole portion 53 through which the head portion 52 of the fixing screw 50 can be inserted, and the second hole portion 55 through which the head portion 52 of the fixing screw 50 cannot be inserted and the shaft portion 54 of the fixing screw 50 can be inserted.

When the fixing screw 50 is a tapping screw, a lower hole without a thread groove may be provided in the optical sensor mounting member 42 instead of the screw hole 49.

The optical sensor mounting member 42 may be fixed to the carriage 28 by snap fitting without using the fixing screw 50. For example, an elastically deformable hooking claw may be provided on the optical sensor mounting member 42, and a hooking hole which can be hooked by the hooking claw may be formed in the support wall 33 to pass therethrough. In this case, the operated part which can be switched between the fixed state in which the optical sensor mounting member 42 is fixed to the carriage 28 and the released state in which the fixed state is released is constituted by a portion of the hooking claw which passes through the hooking hole and protrudes to the side opposite to the support wall 33.

The optical sensor 41 may be mounted on the optical sensor mounting member 42 by the snap fitting.

The insertion hole 51 may be formed in at least one of both side walls of the carriage 28 in the width direction X, and the optical sensor mounting member 42 may be fixed by the fixing screw 50 from the insertion hole 51. In this case, the optical sensor mounting member 42 preferably changes a shape thereof so that the screw hole 49 faces the insertion hole 51.

The printing apparatus 11 may be a printing apparatus configured to spray or discharge a liquid other than ink. A state of the liquid discharged as a small amount of droplets from the printing apparatus includes those having a granular, tear-like, or string-like tail. The liquid described herein may be any material which can be sprayed from the printing apparatus. For example, the liquid may be any liquid in a state when the substance is in a liquid phase, and includes a fluid body such as a liquid body with high or low viscosity, a sol, gel water, or another inorganic solvent, organic solvent, solution, liquid resin, liquid metal, or metal melt. The liquid includes not only liquids as one state of a substance, but also those in which particles of a functional material consisting of solid substances such as pigments or metal particles are dissolved, dispersed, or mixed in a solvent. Representative examples of the liquid include inks described in the above-described embodiment, liquid crystals, and the like. Here, examples of the ink include general water-based inks, oil-based inks, and various liquid compositions such as gel inks and hot melt inks.

The content derived from the above-described embodiment and modified example will now be described.

A printing apparatus includes a carriage having a print head mounted thereon, the carriage being configured to move in a scanning direction, a carriage guide disposed extending in the scanning direction and configured to guide movement of the carriage and to support the carriage, an optical scale member having an optical scale and disposed extending in the scanning direction, an optical sensor mounting member having an optical sensor mounted thereon to read the optical scale of the optical scale member, the optical sensor mounting member being fixed to a support surface of a support wall of the carriage, the support wall being a wall supported by the carriage guide, and an operated part configured to be switchable between a fixed state in which the optical sensor mounting member is fixed to the carriage and a released state in which the fixed state is released, wherein the operated part is located on a side opposite to the support surface with respect to the support wall of the carriage when the optical sensor mounting member is in the fixed state.

According to such a configuration, since the operated part is located on the side opposite to the support surface with respect to the support wall of the carriage, the optical sensor mounting member can be easily switched between the fixed state and the released state without removing the carriage from the carriage guide. Accordingly, since the optical sensor mounting member can be easily mounted on and removed from the carriage, the optical sensor can be easily replaced.

The printing apparatus may include a fixing screw configured to fix the optical sensor mounting member to the carriage, and the operated part may be a head portion of the fixing screw.

According to such a configuration, the optical sensor mounting member can be easily mounted on and removed from the carriage by screwing or loosening the fixing screw.

In the above-described printing apparatus, a screw hole into which the shaft portion of the fixing screw is screwed may be provided in the optical sensor mounting member.

According to such a configuration, the optical sensor mounting member can be easily fixed to the carriage by simply screwing the shaft portion of the fixing screw into the screw hole.

In the above-described printing apparatus, an insertion hole through which the fixing screw is inserted may be provided in the support wall, and the insertion hole may include a first hole portion through which the head portion of the fixing screw can be inserted, and a second hole portion through which the head portion of the fixing screw cannot be inserted and the shaft portion of the fixing screw can be inserted.

According to such a configuration, the attaching and removing operation of the optical sensor mounting member to and from the carriage can be performed without completely removing the fixing screw from the screw hole of the optical sensor mounting member. Accordingly, the dropping of the fixing screw during the attaching and removing operation of the optical sensor mounting member to and from the carriage can be curbed.

In the above-described printing apparatus, when the optical sensor mounting member is in the fixed state, a portion of the optical sensor mounting member may protrude outward in the scanning direction further than the support wall of the carriage in the scanning direction.

According to such a configuration, when the optical sensor mounting member is in the fixed state, a portion of the optical sensor mounting member is visible from the side of the carriage opposite to the support surface side. Thus, when the optical sensor mounting member is removed from the carriage, the optical sensor mounting member can also be easily accessed from the side of the carriage opposite to the support surface side.

In the above-described printing apparatus, a sensor board configured to control the optical sensor may be mounted on the carriage above the carriage guide, the optical sensor may be located above the carriage guide when the optical sensor mounting member is in the fixed state, and the sensor board and the optical sensor may be coupled by a cable.

According to such a configuration, when the optical sensor mounting member is in the fixed state, both the optical sensor and the sensor board are located above the carriage guide, and thus the wiring of the cable can be easily performed.

In the above-described printing apparatus, a cable support part configured to support the cable may be provided on the optical sensor mounting member.

According to such a configuration, since the cable is supported by the cable support part, it is possible to suppress the cable from shaking or coming into contact with other components during the movement of the carriage.

In the above-described printing apparatus, a attaching and removing direction of the optical sensor mounting member to and from the carriage may coincide with the scanning direction.

According to such a configuration, the carriage can be moved to a position at which the attaching and removing operation of the optical sensor mounting member to and from the carriage can be easily performed.

In the above-described printing apparatus, a positioning part configured to position the optical sensor mounting member in the released state may be provided on the carriage.

According to such a configuration, the optical sensor mounting member can be positioned by the positioning part when the optical sensor mounting member is mounted on the carriage.

What is claimed is:

1. A printing apparatus comprising:
   a carriage having a print head mounted thereon, the carriage being configured to move in a scanning direction;
   a carriage guide disposed extending in the scanning direction and configured to guide movement of the carriage and to support the carriage;
   an optical scale member having an optical scale and disposed extending in the scanning direction;
   an optical sensor mounting member having an optical sensor mounted thereon for reading the optical scale of the optical scale member, the optical sensor mounting member being fixed to a support surface of a support wall of the carriage, the support wall being a wall supported by the carriage guide;
   an operated part configured to switch between a fixed state in which the optical sensor mounting member is fixed to the carriage and a released state in which the fixed state is released, and
   a fixing screw configured to fix the optical sensor mounting member to the carriage, wherein
   the operated part includes ii head portion of the fixing screw, and
   when a direction intersecting the scanning direction and in which the medium is transported is a transport direction, the fixing screw is disposed at a position between the carriage guide anti the print head in the transport direction such that the head portion of the fixing screw is directed toward the print head with respect the carriage guide.

2. The printing apparatus according to claim 1, wherein a screw hole into which a shaft portion of the fixing screw is screwed is provided in the optical sensor mounting member.

3. The printing apparatus according to claim 1, wherein
   an insertion hole through which the fixing screw is inserted is provided in the support wall, and
   the insertion hole includes
   a first hole portion through which the head portion of the fixing screw is insertable, and
   a second hole portion through which the head portion of the fixing screw is not insertable and a shaft portion of the fixing screw is insertable.

4. The printing apparatus according to claim 1, wherein, when the optical sensor mounting member is in the fixed state, a portion of the optical sensor mounting member protrudes outward in the scanning direction further than the support wall of the carriage in the scanning direction.

5. The printing apparatus according to claim 1, wherein
   the carriage has a sensor board configured to control the optical sensor mounted thereon upward of the carriage guide,
   the optical sensor is located upward of the carriage guide when the optical sensor mounting member is in the fixed state, and
   the sensor board and the optical sensor are coupled by a cable.

6. The printing apparatus according to claim 5, wherein a cable support part configured to support the cable is provided at the optical sensor mounting member.

7. The printing apparatus according to claim 1, wherein a attaching and removing direction of the optical sensor mounting member to and from the carriage coincides with the scanning direction.

8. The printing apparatus according to claim 1, wherein a positioning part configured to position the optical sensor mounting member in the released state is provided at the carriage.

9. The printing apparatus according to claim 1, wherein the operated part is located on a side opposite to the support surface with respect to the support wall of the carriage when the optical sensor mounting member is in the fixed state.

10. The printing apparatus according to claim 9, wherein a screw hole into which a shaft portion of the fixing screw is screwed is provided in the optical sensor mounting member.

11. The printing apparatus according to claim 9, wherein, when the optical sensor mounting member is in the fixed state, a portion of the optical sensor mounting member protrudes outward in the scanning direction further than the support wall of the carriage in the scanning direction.

12. The printing apparatus according to claim 11, wherein a cable support part configured to support the cable is provided at the optical sensor mounting member.

13. The printing apparatus according to claim 9, wherein
    the carriage has a sensor board configured to control the optical sensor mounted thereon upward of the carriage guide,
    the optical sensor is located upward of the carriage guide when the optical sensor mounting member is in the fixed state, and
    the sensor board and the optical sensor are coupled by a cable.

14. The printing apparatus according to claim 9, wherein an attaching and removing direction of the optical sensor mounting member to and from the carriage coincides with the scanning direction.

15. The printing apparatus according to claim 9, wherein a positioning part configured to position the optical sensor mounting member in the released state is provided at the carriage.

16. A printing apparatus comprising:
- a carriage having a print head mounted thereon, the carriage being configured to move in a scanning direction;
- a carriage guide disposed extending in the scanning direction and configured to guide movement of the carriage and to support the carriage;
- an optical scale member having an optical scale and disposed extending in the scanning direction;
- an optical sensor mounting member having an optical sensor mounted thereon for reading the optical scale of the optical scale member, the optical sensor mounting member being fixed to a support surface of a support wall of the carriage, the support wall being a wall supported by the carriage guide,
- an operated part configured to switch between a fixed state in which the optical sensor mounting member is fixed to the carriage and a released state in which the fixed state is released, and
- a fixing screw configured to fix the optical sensor mounting member to the carriage, wherein
  - the operated part is located on a side opposite to the support surface with respect to the support wall of the carriage when the optical sensor mounting member is in the fixed state,
  - an insertion hole through which the fixing screw is inserted is provided in the support wall, and,
  - the insertion hole includes
    - a first hole portion through which the head portion of the fixing screw is insertable, and
    - a second hole portion through which the head portion of the fixing screw is not insertable and a shaft portion of the fixing screw is insertable.

* * * * *